US008823744B2

(12) United States Patent
Gunderson et al.

(10) Patent No.: US 8,823,744 B2
(45) Date of Patent: Sep. 2, 2014

(54) METHOD FOR INDICATING ANNOTATIONS ASSOCIATED WITH A PARTICULAR DISPLAY VIEW OF A THREE-DIMENSIONAL MODEL INDEPENDENT OF ANY DISPLAY VIEW

(75) Inventors: Benjamin Gunderson, Simi Valley, CA (US); Richard Lee, Pasadena, CA (US)

(73) Assignee: Bluebeam Software, Inc.

( * ) Notice: Subject to any disclaimer, the term of this patent is extended or adjusted under 35 U.S.C. 154(b) by 220 days.

(21) Appl. No.: 13/428,963

(22) Filed: Mar. 23, 2012

(65) Prior Publication Data
US 2013/0249906 A1    Sep. 26, 2013

(51) Int. Cl.
*G09G 5/00*        (2006.01)
(52) U.S. Cl.
USPC .......................................................... 345/636
(58) Field of Classification Search
USPC .......................................................... 345/636
See application file for complete search history.

(56) References Cited

U.S. PATENT DOCUMENTS

| | | | | |
|---|---|---|---|---|
| 5,526,478 | A * | 6/1996 | Russell et al. ................. | 715/202 |
| 6,230,170 | B1 | 5/2001 | Zellweger et al. | |
| 6,611,725 | B1 * | 8/2003 | Harrison et al. ................ | 700/98 |
| 6,697,761 | B2 * | 2/2004 | Akatsuka et al. ............. | 702/151 |
| 6,904,392 | B1 * | 6/2005 | Marty et al. ..................... | 703/1 |
| 7,124,053 | B2 * | 10/2006 | Tanaka et al. ................. | 702/152 |
| 7,151,551 | B2 | 12/2006 | Mandavilli et al. | |
| 7,453,472 | B2 * | 11/2008 | Goede et al. .................. | 345/634 |
| 7,620,904 | B1 * | 11/2009 | Davis et al. ..................... | 715/764 |
| 7,672,822 | B2 * | 3/2010 | Lee et al. ........................... | 703/7 |
| 8,443,280 | B2 * | 5/2013 | Noyes ............................. | 715/230 |
| 2003/0071810 | A1 * | 4/2003 | Shoov et al. .................. | 345/420 |
| 2007/0285424 | A1 | 12/2007 | Cheng et al. | |
| 2008/0247636 | A1 * | 10/2008 | Davis et al. .................... | 382/152 |
| 2008/0313546 | A1 | 12/2008 | Nykamp | |
| 2010/0088239 | A1 * | 4/2010 | Blair et al. ....................... | 705/80 |
| 2011/0063328 | A1 * | 3/2011 | Herman et al. ............... | 345/681 |
| 2011/0169924 | A1 | 7/2011 | Haisty et al. | |
| 2011/0188760 | A1 | 8/2011 | Wright et al. | |

OTHER PUBLICATIONS

Young, Lee, PCT Notification of Transmittal of the International Search Report and the Written Opinion of the International Searching Authority, or the Declaration, pp. 1-8, Mar. 26, 2013.

* cited by examiner

*Primary Examiner* — M Good Johnson
(74) *Attorney, Agent, or Firm* — Stetina Brunda Garred & Brucker

(57) ABSTRACT

An annotation method for a three-dimensional model is disclosed. A first set of data representative of a three-dimensional model is stored in a computer memory. A second set of data representative of an annotation is also stored in the computer memory. The annotation is associated with a first spatial location on the three-dimensional model and a first display view. The three-dimensional model and a first graphical representation of the annotation is displayed according to the first display view, with the annotation being positioned as specified by the associated first spatial location. The displaying of the three-dimensional model is modified to a second display view different from the first display view. The annotation is removed from the display window, and an annotation indicator associated with the annotation is displayed. The annotation indicator is visible independent of any display view of the three-dimensional model.

20 Claims, 6 Drawing Sheets

METHOD FOR INDICATING ANNOTATIONS ASSOCIATED WITH A PARTICULAR DISPLAY VIEW OF A THREE-DIMENSIONAL MODEL INDEPENDENT OF ANY DISPLAY VIEW

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to graphical user interfaces for computer aided design (CAD) and collaboration, and more particularly, to methods for indicating annotations associated with a display view of a three-dimensional model independent of any display view.

2. Related Art

Most conventional engineering, architectural, and other design work is performed with computer aided design (CAD) systems. The availability of computing resources that can meet its demands have led to widespread adoption across a range of diverse industries, as almost every person involved in the workflow process can be provided individual access to sufficient computing power, display, and input capabilities to run CAD applications. Furthermore, numerous CAD software packages are available for varying industry-specific needs and at varying price points. Using such CAD systems, it is possible for engineers, architects, and designers to three-dimensionally model components, assemblies, structures, and so forth. The computerized models can be the basis of future design refinements, and can be used for manufacturing operations. Communication with non-technical personnel within the enterprise such as management and marketing can also be more effective with the use of simplified and easy to understand renderings of the models. Along these lines, within the engineering or design cycle, the computerized models are typically exchanged amongst various personnel collaborating to review and/or edit the same.

Typically, the software applications generate data files or documents that are specific thereto. For instance, the three-dimensional model created in a CAD software application may be saved to a file format that may be proprietary and can only be opened or edited thereby, whether it is the same instance on the same computer, or a different instance on a separate computer. Thus, in order to edit the model, it is necessary for all participating users to have the same CAD software application. With some exceptions, opening the file to view the model may also require the use of the same CAD software application. In recognition of the fact that personnel who have a need to view the file do not necessarily need to edit the file, some developers have produced companion reader-only applications usually made available free-of-charge. Nevertheless, this requires the inconvenient download and installation of a separate software application, and several different ones may be necessary to open each proprietary CAD format.

As a general matter, the existence of many different computing platforms with a wide variety of operating systems, software applications, and processing and graphic display capabilities led to an increasing need for a device-independent, resolution-independent file format to facilitate information exchange. In response to this need, the Portable Document Format (PDF), amongst other competing formats, has been developed. The PDF standard is a combination of a number of technologies, including a simplified PostScript interpreter subsystem, a font embedding subsystem, and a storage subsystem. As those in the art will recognize, PostScript is a page description language for generating the layout, text and the graphics of a document. Further, per the requirements of the PDF storage subsystem, all such elements of the document are encapsulated into a single file.

The document elements are not encoded to a specific operating system, software application, or hardware, but are designed to be rendered in the same manner regardless of the specificities relating to the system writing or reading such data. The cross-platform capability of PDF aided in its widespread adoption, and is now a de facto document exchange standard. Although originally proprietary, PDF has been released as an open standard published by the International Organization for Standardization (ISO) as ISO/IEC 3200-1: 2008. Due to its versatility and universality, files in the PDF format are often preferred over more particularized file formats of specific applications.

Beyond text and basic vector and raster graphics, navigable or interactive three-dimensional graphics may also be incorporated into PDF documents. Referred to generally as 3D PDF, the extensibility of the PDF format is leveraged to enable the embedding of three-dimensional model data formatted according to an open industry standard. One such standard is Universal 3D (U3D), while another is Product Representation Compact (PRC). Each separate PDF reader application may implement the rendering of the three-dimensional model data, but like the PDF format, it is understood to be platform and application independent, and will be rendered identically across all supported reader applications.

From the user interface perspective, PDF documents are typically static in which individual elements thereof are not editable. In the context of the aforementioned three-dimensional models, it is possible to manipulate the view angle thereof, but this is no different than scrolling from top to bottom or left to right in a two-dimensional document, and modifications to the model itself are not possible. However, one of several improvements that have been made since the initial releases of PDF readers, writers, and the standard itself, is the support for adding annotations to a base document. Such annotations are graphically overlaid or "placed" on the underlying document, with placement being precisely controlled by the user. Thus, the functionality is similar to graphic illustration/design and image manipulation applications where various objects can be positioned on a document canvas by navigating a cursor to a desired location and providing a subsequent input to make placement permanent. Before positioning the cursor, the object to be placed, such as a geometric primitive, a text box, or the like, is selected. This improved functionality permitted the rapid discussion of comments and suggested revisions within the working group as marked up versions of the document was exchanged.

While the implementation of the annotation feature in relation to two-dimensional documents is a relatively straightforward proposition because the placement of graphical content on different layers is already implemented in the base PDF rendering, there are a number of challenges associated with transferring that feature to three-dimensional models. A potential issue is the manner in which the two-dimensional text and graphic primitives are placed and rendered in a three-dimensional environment; x and y axis positioning and parameter data thereof is available, but corresponding z axis data is undefined. As a further effect, annotations may appear visibly skewed or otherwise unintelligible unless the view is further manipulated, and may result in annotations being placed at unintended locations.

One possible resolution involves the use of a real-time collaboration environment, in which the two dimensional views as displayed on a primary computer is synchronized with the views as displayed on one or more secondary computers. The switching of camera views is thus keyed to specific annotations, and such an approach is disclosed in U.S. Pat. No. 7,151,551 to Mandavilli et al. The specific camera views and the annotations placed thereon may be recorded for subsequent display. However, it is necessary for the reviewer to navigate to a particular camera view before the pertinent annotations are shown. Alternatively, an interactive listing of annotations may be generated, through which the reviewer can select specific annotations for display, though this is understood to be a cumbersome process.

Accordingly, there is a need in the art for improved methods for the annotation of three-dimensional models, and indicating annotations associated with a display view of a three-dimensional model independent of any display view.

BRIEF SUMMARY

The present disclosure contemplates an annotation method for a three-dimensional model. The method may include storing a first set of data into a computer memory. The first set of data may be representative of the three-dimensional model. There may also be a step of storing a second set of data into the computer memory. This second set of data may be representative of an annotation. The annotation may be associated with a first spatial location on the three-dimensional model and a first display view. The method may continue with displaying the three-dimensional model and a first graphical representation of the annotation in a display window according to the first display view. The annotation may be positioned as specified by the first spatial location that is associated with the annotation. There may also be a step of modifying the displaying of the three-dimensional model in the display window to a second display view that is different from the first display view. The method may further include removing the annotation from the display window. Additionally, there may be a step of displaying an annotation indicator in the display window. The annotation indicator may be associated with the annotation. It may also be visible on the display window independent of any display view of the three-dimensional model. A computer-readable medium having computer-readable instructions that perform this method is also disclosed.

The annotation indicator may be associated with a second spatial location relative to the three-dimensional model. In accordance with another embodiment of the present disclosure, the first display view and the second display view may each be defined by respective first set of view area limitations and second set of view area limitations that restrict which spatial locations along the three-dimensional model are visible therein. The aforementioned step of modifying the displaying of the three-dimensional model in the display window may result in the second spatial location of the annotation indicator being outside the second set of view area limitations. Where this is the case, the annotation indicator may be displayed on a periphery of the display window.

Yet another embodiment envisions that the first display view and the second display view may have obstructed spatial locations of the three-dimensional model. In this instance, the annotation indicator may be overlaid on the three-dimensional model in the second display view with the second spatial location being one of the obstructed spatial locations.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The present disclosure contemplates various embodiments of methods for indicating aggregates of one or more annotations associated with a display view of a three-dimensional model. The detailed description set forth below in connection with the appended drawings is intended as a description of the presently contemplated embodiments, and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
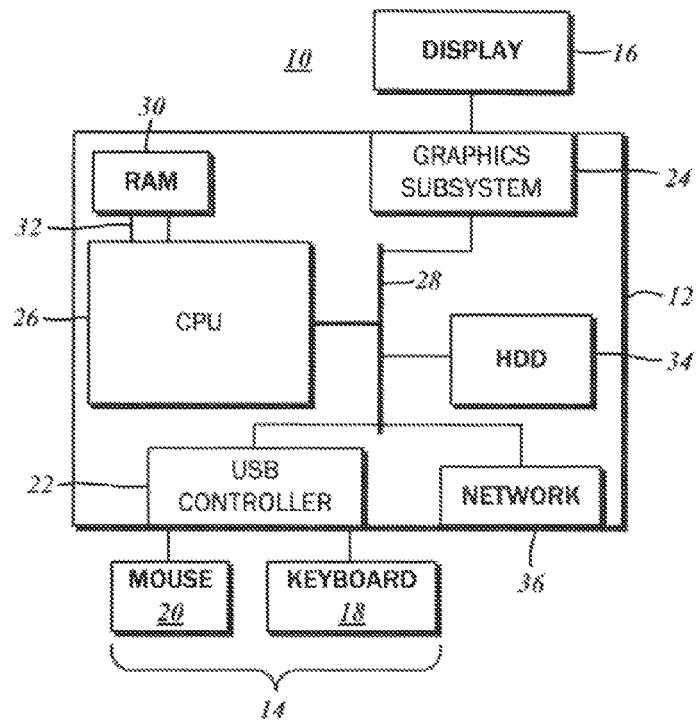
FIG. 1 is a block diagram of an exemplary computer system upon which various embodiments of the present disclosure may be implemented.

Referring now to FIG. 1, the methods disclosed herein may be performed on a computer system 10, and may be implemented as executable software instructions that are stored thereon. Generally, the computer system 10 is comprised of a system unit 12 that performs the software instructions, input devices 14 that direct the operation of the system unit 12, and an output device 16 that visualizes the outputs or results of executing the software instructions. More particularly, the input devices 14 may be a keyboard 18, a mouse 20, or any other suitable device that can accept user input and generate corresponding inputs to the system unit 12. Although there are various peripheral interconnect modalities known in the art, the depicted input devices 14 are connected to the system unit 12 via a USB (universal serial bus) controller 22. The output device 16 may be a display unit such as a LCD (liquid crystal display) or CRT (cathode ray tube) monitor, though any other suitable device may be substituted. It may be connected to the system unit 12 via a graphics subsystem 24, which generates the particular signals necessary to produce a visual response.

In further detail, the system unit 12 further includes a central processing unit 26 that is connected to both the aforementioned USB controller 22 and the graphics subsystem over an input/output bus 28. The CPU 26 is capable of accepting inputs from the input devices 14, execute the pre-programmed instructions in accordance with such inputs, and generate results of executing the instructions to the output device 16. The CPU 26 may be any one of numerous commercially available variants such as the Intel x86. The instructions may be temporarily stored in a random access memory 30 that is also connected to the CPU 26 via a dedicated memory channel 32. A more permanent storage location is a hard disk drive 34. It is possible for the computer system 10 to communicate with other computer systems, and accordingly includes a network module 36.

The management of the aforementioned hardware components is handled by an operating system with a graphical user interface (GUI) such as Windows from Microsoft Corporation of Redmond Wash. and so forth. A document reviewing application is be installed on the computer system 10, and runs on the operating system. The software instructions that comprise the document reviewing application, along with those of the operating system, are tangibly embodied in a computer-readable medium, e.g., the hard disk drive 34 or any other fixed or removable data storage medium. The document reviewing application is contemplated to include various instructions that perform or execute the steps of the annotation method for a three-dimensional model.

The foregoing computer system 10 represents only one exemplary apparatus suitable for implementing the various aspects of the present disclosure. As such, the computer system 10 may have many different configurations and architectures. Any such configuration or architecture may be readily substituted without departing from the scope of the present disclosure.

Figure 2:
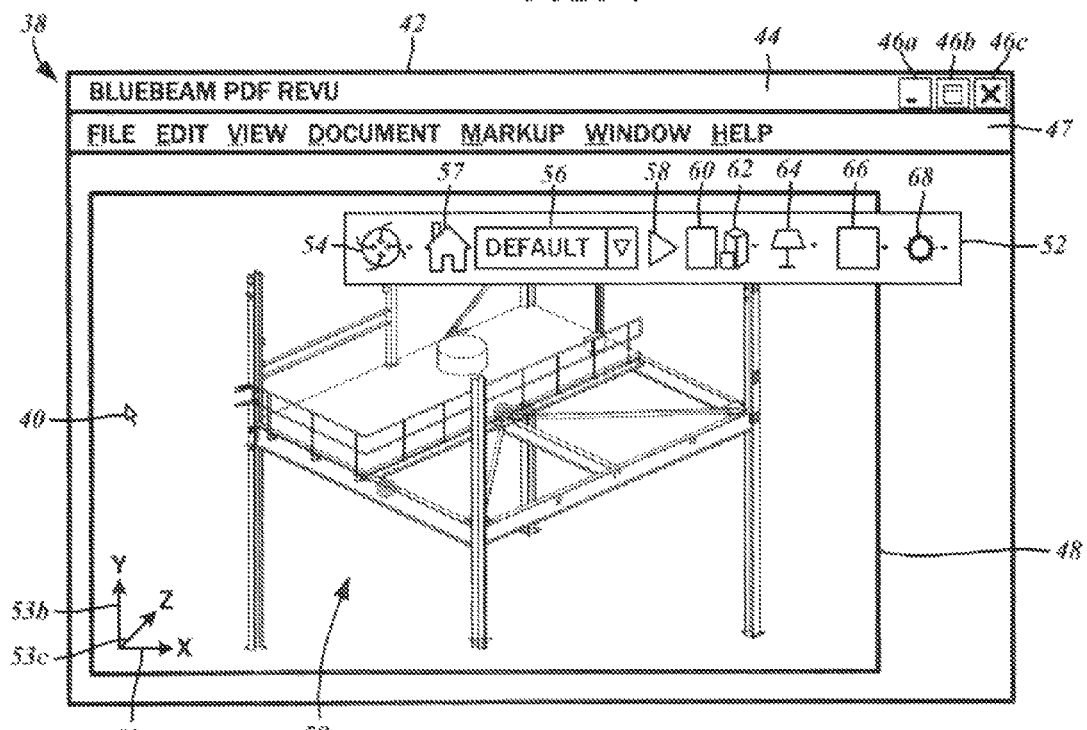
FIG. 2 is an exemplary user interface of a software application for viewing and annotating the three-dimensional model.

FIG. 2 illustrates an example GUI 38 of the document reviewing application. In one embodiment, the document reviewing application may be a portable document format (PDF) viewer that can render embedded three-dimensional models. While the various features set forth below are described in relation to such a PDF reviewing application, it will be appreciated that the contemplated aspects of the disclosure are also applicable to other graphic manipulation software applications.

As mentioned above, software such as the PDF reviewing application runs on a windowing system, and accordingly is understood to have a consistent behavior with regard to user interaction. The graphics comprising the GUI 38 are output to the display or output device 16, one element being a cursor 40. The movement of the cursor 40 is tied to the movement of the mouse 20, with further interaction with the other graphical elements of the GUI 38 being activated via buttons on the mouse 20. Input from the keyboard 18 may also invoke corresponding functionality of the application. The following description refers to "clicking" the mouse buttons, "positioning" the cursor, "holding" the mouse button to "drag" an on screen object or rotating the view, and so forth. It will be appreciated that such terms have standard meanings relative to interactions with the GUI 38 specifically and more generally with the computer system 10. Other input modalities such as tablet pens/digitizers may also be utilized, and the corresponding actions therewith are also intended to be applicable when referring to such input actions.

Along these lines, the GUI 38, as part of the PDF reviewing application running on windowing system, accordingly has a number of interface elements that are common thereto. The primary interface may be a main window 42 with a title bar 44 with basic window controls 46a-46c, which minimize, maximize, and close the main window 42. The main window 42 further includes a menu bar 47, from which the specific functions of the PDF reviewing application may be invoked. Within the main window 42 is a workspace window 48, inside which a document, and in particular, a three-dimensional model 50, is rendered. The three-dimensional model 50 is understood to be a U3D (Universal 3D) or PRC (Product Representation Compact) formatted data that is embedded within the PDF document opened in the workspace window 48. It will be recognized by those having ordinary skill in the art that generally, three-dimensional models are represented by a set of geometric data, which is typically comprised of Cartesian coordinates along an x-axis 53a, a y-axis 53b, and a z-axis 53c. The example architectural model shown in FIG. 2 and referenced elsewhere in the present disclosure includes a plurality of discrete three-dimensional objects that are comprised of a plurality of planes and vertices defined by a set of coordinates. Each individual object may also be referred to as nodes, and depending on the visualization preferences, certain nodes may be shown, hidden, or made transparent.

Rendering the three-dimensional view onto a two-dimensional display involves projecting the various points of the three-dimensional model 50 onto a view plane that corresponds to the workspace window 48, as viewed from a virtual focal point. The particular location and/or angle at which the three-dimensional model 50 is viewed and shown in the workspace window 48 may also be referred to as a camera position/angle, though it may be more generally referred to as a display view.

When viewing the three-dimensional model 50 in the workspace window 48, a toolbar 52 is displayed. The toolbar contains various activatable buttons that, when pressed, initiate functionality particular to viewing three-dimensional objects. A viewing mode button 54 invokes a drop-down menu of selectable functions of the mouse or other input device when interacting with the GUI 38. In a rotate mode, the view or camera is moved around the model. In a spin mode, the model is rotated around a specific point. A pan mode allows the lateral up/down or left/right movement of the view or camera, and a zoom mode expands or contracts the size of the three-dimensional model 50. When the camera mode is selected, it allows the pinning of the view to a specific location, and modifying the direction (though not the position) of the view or camera to see other parts of the three-dimensional model 50.

Next, there is a display view selection menu box 56. As indicated above, the display view is the particular location and/or angle at which the three-dimensional model 50 is viewed. Several different predefined display views may be provided, though it is also possible to navigate to a particular display view and saving it for subsequent invocation. Pressing a home button 57 resets the display view to a default display view.

For most purposes, the display view shown in the workspace window 48 remains static, with changes thereto only occurring in response to user navigation input. In some circumstances, however, it is possible to animate the display view, such as rotating the three-dimensional model 50, or cycling through different display views such as those set or predefined as mentioned above. An animation activation button 58 initiates the dynamic display view changes. While the animation is playing, the animation activation button 58 can be replaced with an animation pause button (not shown), which causes the animation to stop.

Another component of the display view is the type of three-dimensional to two-dimensional projection techniques utilized. One contemplated technique is orthogonal projection, which keeps the relative sizes of each object the same, regardless of the viewing distance. Another contemplated technique is perspective projection, which renders objects closer to the focal point appear larger than objects further away. Perspective projection attempts to mimic the viewing of a three-dimensional object in the real world. Selecting between these two projection techniques is achieved via a projection selection button 60.

Differing appearances of the three-dimensional model 50 can be selected. One option is to change the rendering style via a mode selection button 62. One possible selection is a solid rendering, where a texture is added to each node, such that other nodes that appear behind it remain hidden. Another possible selection is transparent, where the opacity of each node is reduced such that other objects behind it are visible. Yet another possible selection is a solid wireframe, where the triangular meshes that define the elements or nodes of the three-dimensional model 50 are displayed. There is also an option to change the lighting characteristics of the display view and how the three-dimensional model 50 appears under such lighting via a lighting control button 64. Among the possible options include white light, daylight, bright, primary color, night, blue, red, cube, CAD optimized, and headlamp. In addition to the lighting style, the background color of the workspace window 48 may be selected via a background selection button 66.

There are several additional parameters that can be specified to the foregoing display and three-dimensional navigation functions. A configuration button 68 may invoke a separate window that contains various selection user interface elements such as buttons, radio buttons, checkboxes, menus, and text input boxes through which these parameters may be set. Those having ordinary skill in the art will be able to ascertain the appropriate level of possible adjustments.

Figure 3:
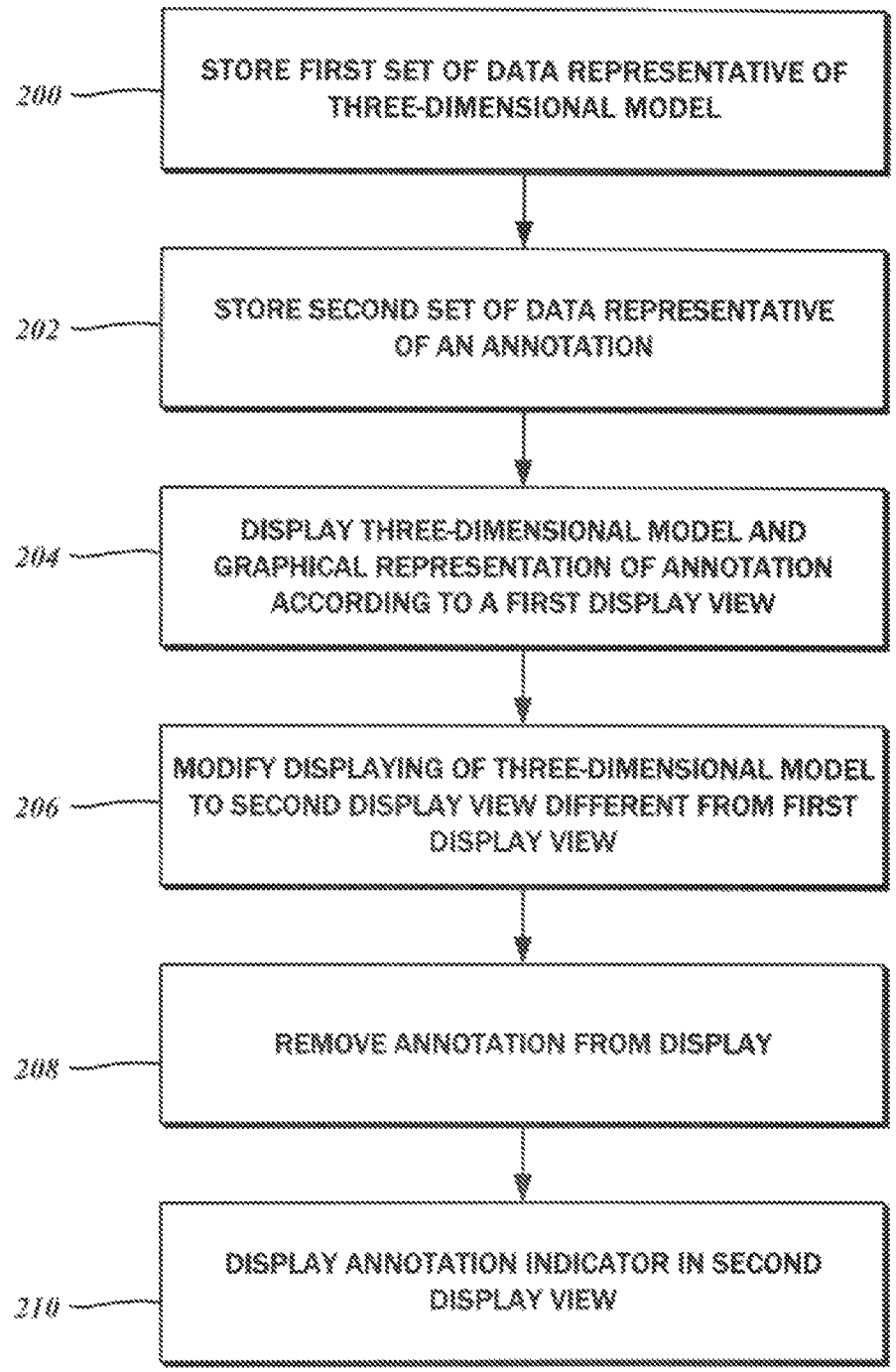
FIG. 3 is a flowchart illustrating one embodiment of an annotation method for a three-dimensional model.

With reference to the flowchart of FIG. 3, the contemplated annotation method for the three-dimensional model 50 begins with a step 200 of storing in a memory or data storage device of the computer system 10 a first set of data representative of the three-dimensional model 50. As mentioned above, the three-dimensional model 50 is defined by a set of connected planes and vertices that are themselves defined by a series of boundary coordinates. This data can be stored in the PDF file that is in turn stored on the hard disk drive 34, retrieved from another computer system via a network link that connects to the networking module 36, and so forth. For fastest rendering, the data representative of the three-dimensional model 50 is temporarily stored in the RAM 30.

The PDF application has an annotation feature, that is, a capability of accepting inputs to the GUI 38 corresponding to the placement of an annotation, markup, or other secondary content visually overlaid on the document. Generally, annotations are understood to be a data object that is associated with an underlying document, and may be a conceptual entity for a contiguous block of memory at a specific location and with a specific size, and is defined by one or more properties that define its characteristics. An annotation may be defined by a type, or a broad category of objects such as geometric primitives including points, lines (single segment or multi-segment), arcs, ellipses, polygons and the like. Annotations may also take more complex forms such as callout boxes, arrows, text/note boxes, and so forth. The PDF standard defines several common annotation types that may be rendered similarly across diverse reader applications, though with slight variances in appearance from one implementation to another. The particular characteristics of the annotation may be defined by one or more parameters including dimensions, placement location, color, line thickness, fill patterns and colors, and others that are specific to the annotation type.

Figure 4:
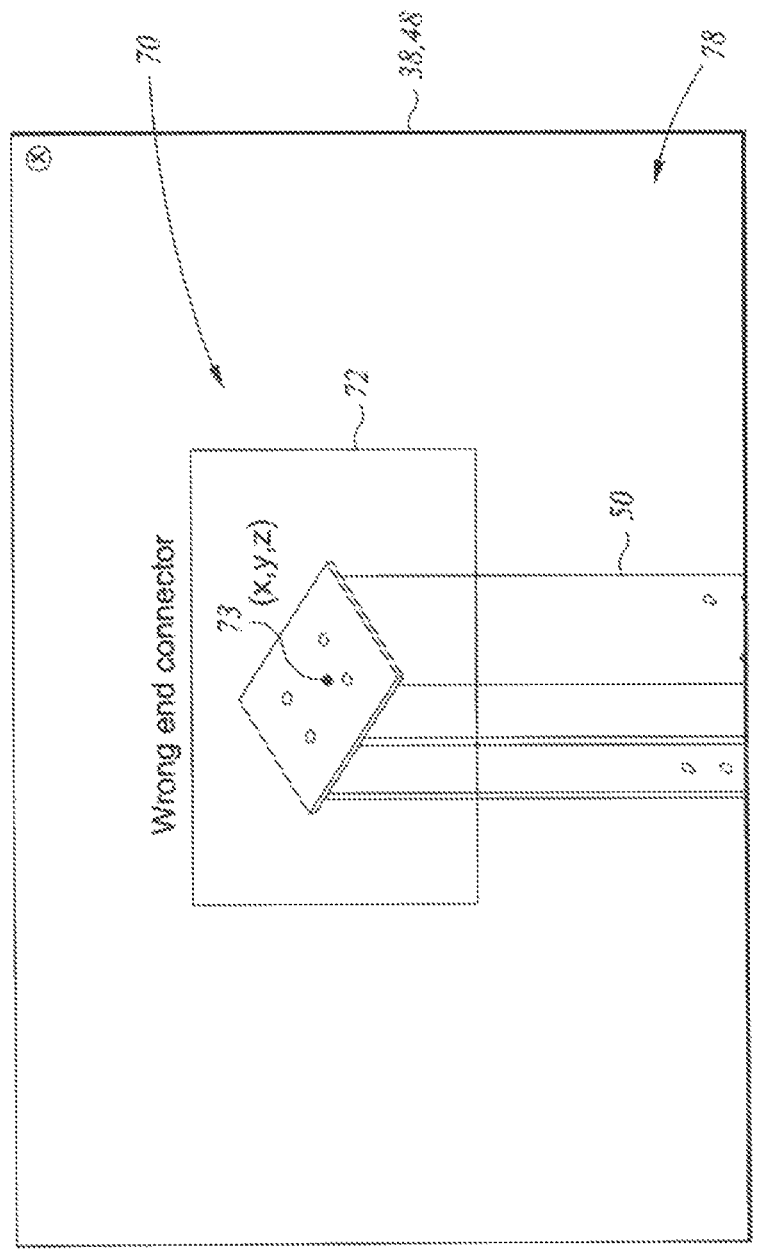
FIG. 4 is a detailed view of the user interface showing a first display view of the three-dimensional model including annotations.

The example GUI 38 shown in FIG. 4 includes a first display view 70 of the three-dimensional model 50. By way of example, the first display view 70 is zoomed in on a particular feature of the three-dimensional model 50, and represents a projection thereof on to a first view plane from a particular view angle (camera angle). Overlaid thereon is a first annotation 72, which is a two-dimensional rectangle that they serve to highlight a point on the three-dimensional model 50 requiring attention from the user. The first annotation 72 may include text, which in the illustrated example reads "Wrong end connector." Instead of being part of the first annotation 72, the text may be its own separate annotation.

Referring back to the flowchart of FIG. 3, the annotation method may continue with a step 202 of storing in the computer memory a second set of data that is representative of an annotation. In the context of the foregoing example, this refers to storing the first annotation 72 and its constituent data (for example, a polygon type having vertices with specific endpoint coordinate values and line thickness, together with a text type having specific text content, font size and type, etc.) to a storage of the computer system 10. Through interaction with the GUI 38, it is possible to receive such attributes of the first annotation 72 as a representative graphic by clicking on the desired placement location and dragging the cursor 40 to the desired opposite corner. Alternatively, the attributes may be specified as numeric values entered into a text input fields. This is understood to correspond to a possible step in the method previous to the storing step 202 of receiving an instruction to generate the first annotation 72, and the corresponding second set of data that represents it. The attributes may be temporarily stored in the RAM 30 though in association with the underlying PDF document. Additionally, the same data could be stored more permanently in the hard disk drive 34.

According to a step 204, the annotation method includes displaying the three-dimensional model 50 and a graphical representation of the first annotation 72 in a display window, e.g., the workspace window 48. The view of the three-dimensional model 50 and the first annotation 72 is in accordance with the aforementioned first display view 70. In further detail, the first annotation 72 is placed within the three-dimensional environment, inside of which the model 50 is being rendered. The specific position corresponds to a first spatial location 73 within that three-dimensional environment, and may be defined by a set of coordinates as discussed above. In this regard, the term three-dimensional environment is referenced interchangeably with the three-dimensional model 50, as the coordinates within the environment corresponds to the coordinates relative to the model. By way of example only, the first spatial location 73 is the center point of the first annotation 72.

In addition to recording its placement location and its attributes, the first annotation 72 is associated with the first display view 70 on which it was placed. As mentioned earlier, it is possible to define various display views of the three-dimensional model 50, and by associating each annotation with a specific display view, it is possible to limit its visualization thereto. Thus, because the first annotation 72 is associated only with the first display view 70, it may appear on the workspace window 48 only when the first display view 70 is invoked.

The first display view 70 is further defined by a view position, a center of rotation, rendering style, lighting, projection style, background color, node visibility, and cross-section. The details of some of these view parameters were discussed above in relation to the toolbar 52 feature and the various ways in which the display of the three-dimensional model 50 can be navigated and configured. Furthermore, for some purposes a cross-section of the three-dimensional model 50 may be shown, and in which case a clipping plane that intersects with the model is a definable parameter. In general, the first display view 70, as well as any other display view for that matter, is understood to be a snapshot of the three-dimensional model 50 that incorporates all of or substantially all of the characteristics or view parameters that define that particular view. It is possible to ignore one or more characteristics (such as lighting style or background color) and instead substitute it for a preset or predefined view parameter. For example, instead of utilizing the particular background associated with the display view, a default background color may be rendered instead for purposes of consistency.

To the extent that a particular display view, for example the first display view 70, is not previously defined, the initial placement of the first annotation 72 on to the workspace window 48 is operative to so establish the first list display view 70. All subsequent annotations that are placed while the first display view 70 remains invoked, is associated therewith in accordance with the presently contemplated annotation method.

Figure 5:
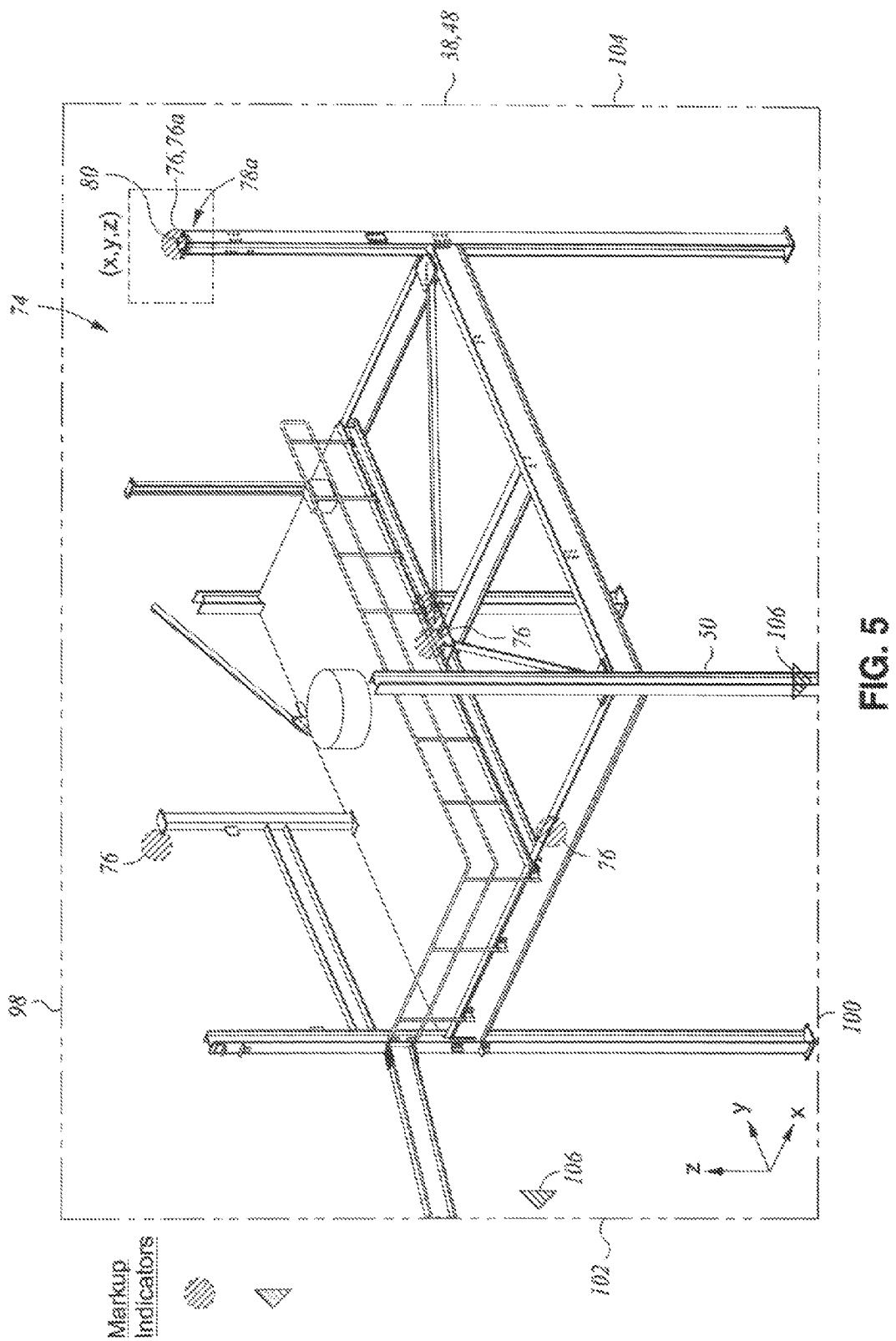
FIG. 5 details the user interface showing a second display view the three-dimensional model and various annotation indicators overlaid thereon.

Referring back to the flowchart of FIG. 3, the method continues with a step 206 of modifying the displaying of the three-dimensional model 50 in the display window or workspace window 48. As contemplated herein, modifying the displaying is understood to be panning, spinning, rotating, zooming, or otherwise navigating the view of the three-dimensional model 50 to a different display view. An exemplary second display view 74 is shown in FIG. 5, which is a zoomed-out view that shows the substantial entirety of the architectural structure in comparison to the more detailed first display view 70 shown in FIG. 4. Like the first display view 70, the second display view 74 is representative of a projection of the three-dimensional model 50 onto a view plane, albeit one that is different and correspondingly has a different view angle (camera angle).

Upon modifying the display, the resultant second display view 74 is different from the first display view 70. In this regard, alternative embodiments contemplate that other modifications to the view besides the aforementioned three-dimensional navigation operations such as changing the background color or the lighting options are also intended to be encompassed within the scope of the modifying step. Generally, the modifying step can be initiated by user inputs to the GUI 38 that correspond to such operations, from which a set of instructions are generated to a component of the PDF reviewing application that renders the three-dimensional model 50.

As explained above, annotations are associated with a particular display view, and in the case of the first annotation 72, its visibility may be limited to the first display view 70. Therefore, after modifying the display to the second display view 74, the method continues with a step 208 of removing the first annotation 72 from the display window or workspace window 48.

With reference again to the second display view 74 shown in FIG. 5, and also referring to the flowchart of FIG. 3, the method continues with a step 210 of displaying an annotation indicator 76. According to various embodiments of the present disclosure, the annotation indicator 76 references the annotation or annotations of a particular display view, and are shown within the workspace window 48 independent of any display view of the three-dimensional model 50, whether it be the second display view 74 as illustrated in FIG. 5, or another third display view 77 shown in FIG. 6. The particular annotation indicator 76a is positioned in a display area 78a of the second display view 74 that corresponds to a display area 78b of the first display view 70. Furthermore, the annotation indicator 76a is also logically linked to the first annotation 72 shown in the first display view, and if there are any additional annotations therein, then those would likewise be logically linked to the annotation indicator 76a. It is envisioned that each annotation indicator 76 displayed within the workspace window 48 is tied to a specific display view.

Being objects that are specifically positioned within the three-dimensional environment, the annotation indicator 76 also has a second spatial location 80 associated therewith that is defined in relation to such three-dimensional environment and more specifically, the three-dimensional model 50. As a general matter, this second spatial location 80 is understood to correspond to the same area that is the focus of the associated first display view 70 and related first annotation 72. More particularly, the second spatial location 80 may be in close proximity to a center of rotation of the first display view 70, that is, a specific position around which the three-dimensional object 50 may be rotated when in the first display view 70.

Figure 7:
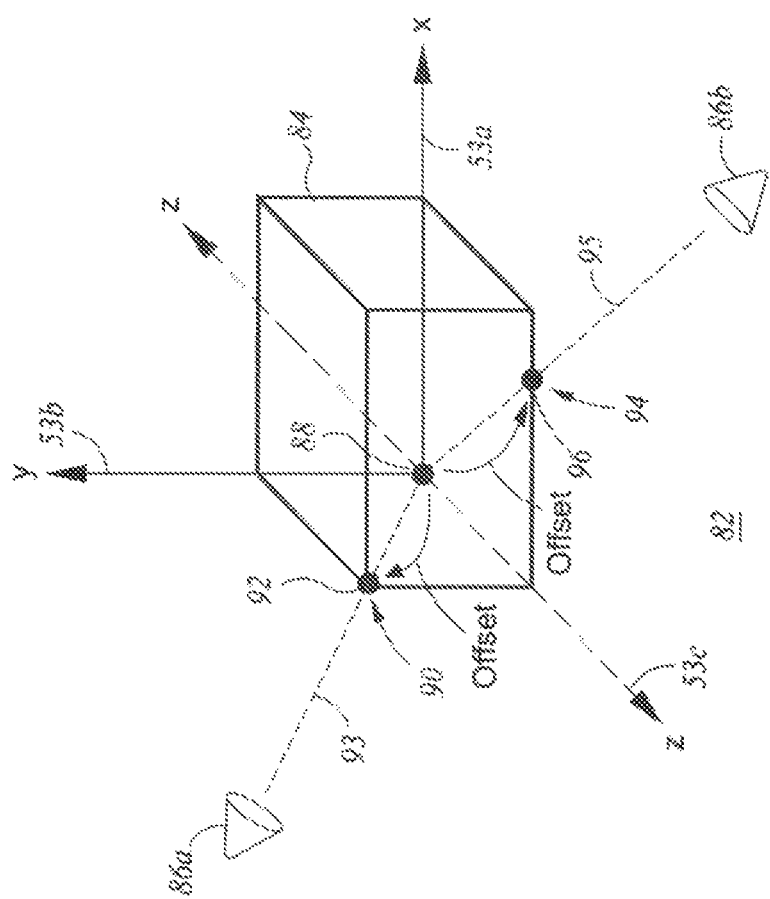
FIG. 7 is a diagram of a three-dimensional graphics environment illustrating the offsetting of annotation indicators corresponding to annotations placed in the same vicinity of each other from different view angles.

With reference to FIG. 7, there is depicted an exemplary three-dimensional graphics environment 82 with the x-axis 53a, the y-axis 53b, and the z-axis 53c. Positioned within this environment 82 is an example solid 84 that has dimensions along each of the axes 53. The present disclosure contemplates the possibility of multiple display views for a given area of the environment 82, that is, annotations being placed in close proximity to each other, but at slightly different view angles or positions. This also means that different display views may be associated with each annotation. The example of FIG. 7 illustrates a situation where there is one display view 86a from one view angle and another display view 86b from a different view angle. Different annotations may be placed within such display views 86, but for both display views, a center of rotation 88 is the same. When generating and displaying a corresponding annotation indicator, if the same center of rotation 88 were to be the spatial location of the respective annotation indicators, there would be an overlap and therefore be indistinguishable. To reduce this likelihood, a spatial location 90 of a first annotation indicator 92 is offset by a predetermined distance along a view axis 93 extending from the center of rotation 88 to a center of focus of the display view 86a. Likewise, a spatial location 94 of a second annotation indicator 96 is offset by the same offset along a view axis 95 extending from the center of rotation 88 to a center of focus of the display view 86b. The offset distance may be specified through the GUI 38, preset, or generated randomly.

The workspace window 48 defines a set of view area limitations characterized by a top border 98, an opposite bottom border 100, a left side border 102, and an opposite right side border 104. Although applied specifically to the second display view 74, such borders exist for the first display view 70 as well. These borders restrict which spatial locations within the three-dimensional environment, i.e., the three-dimensional model 50 are visible via the GUI 38. When the display view is manipulated to such an extent that any of the annotation indicators are no longer visible, a corresponding secondary indicator 106 therefor is generated. With the illustrated example of FIG. 5, the secondary indicator 106 is a triangularly shaped element that points in the general direction in which the actual spatial location of the annotation indicator is disposed, along the respective one of the borders or periphery that is closest to the same. The relative position along the border of periphery is also determined in relation to the actual spatial location of the annotation indicator, and is understood to be the closest thereto. Where there are multiple annotation indicators off-screen, then a corresponding secondary indicator is displayed for each.

Figure 6:
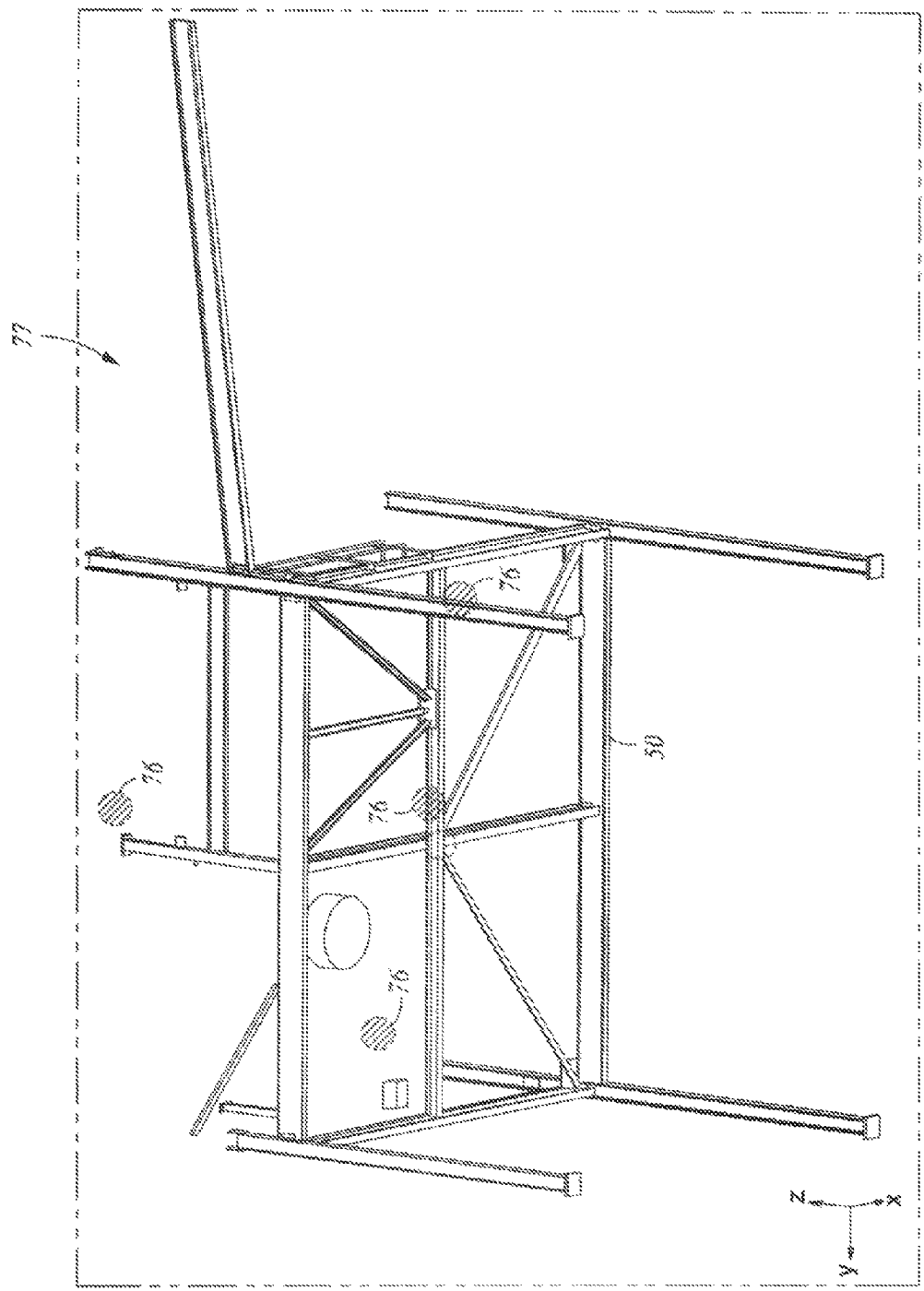
FIG. 6 details the user interface showing another second display view of the three-dimensional model and the annotation indicators.

Referring now to FIG. 6, various embodiments of the present disclosure contemplate that the annotation indicator 76 maintains a persistent visibility regardless of the display view, even if it would otherwise be obstructed by the three-dimensional model 50. The spatial location of the annotation indicator 76 does not need to change and positioned according to the aforementioned conventions, but portions of the three-dimensional model 50 are rendered transparently to ensure that the annotation indicator 76 remains visible.

Both the annotation indicators 76 and the secondary annotation indicators 106 are interactive elements that can be activated via the GUI 38. One embodiment contemplates the invocation of the associated display view. For example, clicking the annotation indicator 76a can invoke the corresponding first display view 70 as shown in FIG. 4, with the first annotation 72 being shown. By reference to invoking the first display view 70, it is intended that the second display view 74, or whichever originating display view, is modified to the first display view 70 in a manner similar to that discussed above for the reverse. Alternatively, hovering or a "mouseover" input with respect to the annotation indicators 76 or the secondary annotation indicators 106 may invoke a preview display, showing a reduced size, reduced resolution snapshot of the first display view 70, or a listing of the annotation contents associated with the first display view 70. It is also possible to simply display the number of annotations associated with the particular secondary annotation indicator 106, inside the annotation indicator 76 itself. One of ordinary skill in the art, in light of these enumerated features of the present disclosure, may envision other related and similar notifications or alerts that suggest the volume and content of the annotations in the associated display view.

The particulars shown herein are by way of example and for purposes of illustrative discussion of the embodiments of the present disclosure only and are presented in the cause of providing what is believed to be the most useful and readily understood description of the principles and conceptual aspects. In this regard, no attempt is made to show details of the present invention with more particularity than is necessary, the description taken with the drawings making apparent to those skilled in the art how the several forms of the present invention may be embodied in practice.

What is claimed is:

1. An annotation method for a three-dimensional model, the method comprising:
   storing in a computer memory a first set of data representative of the three-dimensional model;
   storing in the computer memory a second set of data representative of an annotation associated with a first spatial location on the three-dimensional model and a first display view;
   displaying the three-dimensional model and a first graphical representation of the annotation in a display window according to the first display view, the first graphical representation of the annotation being positioned as specified by the first spatial location associated with the annotation;
   modifying the displaying of the three-dimensional model in the display window to a second display view different from the first display view;
   removing, in response to modifying the displaying to the second display view, the first graphical representation of the annotation from the display window; and
   displaying, in the display window in response to modifying the displaying to the second display view and as a substitute for the removed first graphical representation of the annotation, an annotation indicator representative of the annotation, the annotation indicator being visible on the display window independent of any display view of the three-dimensional model.

2. The method of claim 1, wherein:
   the first display view is defined by a first projection of the three-dimensional model onto a first view plane; and
   the second display view is defined by a second projection of the three-dimensional model onto a second view plane different from the first view plane.

3. The method of claim 1, wherein the first display view and the second display view are each further defined by one or more view parameters that sets a visual appearance of the three dimensional model.

4. The method of claim 1, wherein the annotation indicator is associated with a second spatial location relative to the three-dimensional model.

5. The method of claim 4, wherein the second spatial location is in close proximity to another spatial location corresponding to a point of rotation of the first display view.

6. The method of claim 5, wherein the second spatial location is offset from the other spatial location corresponding to the point of rotation of the first display view by a predetermined value in a predetermined direction.

7. The method of claim 4, wherein the first display view and the second display view are each defined by respective first set of view area limitations and second set of view area limitations that restrict which spatial locations along the three-dimensional model are visible therein.

8. The method of claim 7, wherein:
   the modifying the displaying of the three-dimensional model in the display window results in the second spatial location of the annotation indicator being outside the second set of view area limitations; and
   the annotation indicator is displayed on a periphery of the display window.

9. The method of claim 8, wherein the annotation indicator is displayed on a point along the periphery of the display window axially aligned with the second spatial location.

10. The method of claim 8, wherein the annotation indicator includes a direction pointer corresponding to a bearing to the second spatial location on the second display view.

11. The method of claim 4, wherein:
    the first display view and the second display view have obstructed spatial locations of the three-dimensional model;
    the annotation indicator is overlaid on the three-dimensional model in the second display view with the second spatial location being one of the obstructed spatial locations.

12. The method of claim 1, wherein the first graphical representation of the annotation is overlaid on the three-dimensional model.

13. The method of claim 1, wherein the first spatial location of the annotation is defined by a plurality of coordinate values.

14. The method of claim 1, further comprising:
receiving a selection of the annotation indicator through a user interface;
modifying the display of the three-dimensional model in the display window to the first display view in response to receiving the selection of the annotation indicator; and
displaying the first graphical representation of the annotation in the display window and positioned according to the first spatial location associated therewith.

15. The method of claim 1, further comprising:
receiving, through a graphical user interface, a first instruction to generate the annotation and the second set of data representative thereof while the graphical user interface shows the first display view.

16. The method of claim 15, wherein modifying the displaying of the three-dimensional model in the display window to the second display view is in response to a second instruction received through the graphical user interface.

17. The method of claim 1, further comprising:
displaying, in the display window, a summary notification of the annotation associated with the annotation indicator.

18. An article of manufacture comprising a non-transitory program storage medium readable by a computer, the medium tangibly embodying one or more programs of instructions executable by the computer to perform an annotation method for a three-dimensional model, the method comprising:
storing in a computer memory a first set of data representative of the three-dimensional model;
storing in the computer memory a second set of data representative of an annotation associated with a first spatial location on the three-dimensional model and a first display view;
displaying the three-dimensional model and a first graphical representation of the annotation in a display window according to the first display view, the first graphical representation of the annotation being positioned as specified by the first spatial location associated with the annotation;
modifying the displaying of the three-dimensional model in the display window to a second display view different from the first display view;
removing, in response to modifying the displaying to the second display view, the first graphical representation of the annotation from the display window; and
displaying, in the display window in response to modifying the displaying to the second display view and as a substitute for the removed first graphical representation of the annotation, an annotation indicator representative of the annotation, the annotation indicator being visible on the display window independent of any display view of the three-dimensional model.

19. The article of manufacture of claim 18, wherein the annotation indicator is associated with a second spatial location relative to the three-dimensional model, the second spatial location being offset from another spatial location corresponding to the point of rotation of the first display view by a predetermined value in a predetermined direction.

20. The article of manufacture of claim 18, wherein the first display view and the second display view are each defined by respective first set of view area limitations and second set of view area limitations that restrict which spatial locations along the three-dimensional model are visible therein, the modifying the displaying of the three-dimensional model in the display window resulting in the second spatial location of the annotation indicator being outside the second set of view area limitations, with the annotation indicator being displayed on a periphery of the display window.

* * * * *